(12) United States Patent
Childers et al.

(10) Patent No.: US 10,215,932 B2
(45) Date of Patent: *Feb. 26, 2019

(54) FIBER OPTIC FERRULE WITH REAR HOLES TO ALIGN A GUIDE PIN CLAMP WITH FIELD CHANGEABLE GUIDE PINS

(71) Applicant: US Conec, Ltd., Hickory, NC (US)

(72) Inventors: Darrell R. Childers, Hickory, NC (US); Michael E. Hughes, Hickory, NC (US); Myron W. Yount, Conover, NC (US); Brent D. Henley, Maiden, NC (US); Joseph L. Graham, Hickory, NC (US)

(73) Assignee: US Conec, Ltd, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,292

(22) Filed: Nov. 13, 2017

(65) Prior Publication Data
US 2018/0067269 A1 Mar. 8, 2018

Related U.S. Application Data

(63) Continuation of application No. 15/247,839, filed on Aug. 25, 2016, now Pat. No. 9,817,194.

(60) Provisional application No. 62/189,925, filed on Jul. 8, 2015.

(51) Int. Cl.
*G02B 6/38* (2006.01)

(52) U.S. Cl.
CPC ......... *G02B 6/3882* (2013.01); *G02B 6/3869* (2013.01); *G02B 6/3885* (2013.01); *G02B 6/3898* (2013.01); *G02B 6/3802* (2013.01); *G02B 6/3846* (2013.01); *G02B 6/3865* (2013.01); *G02B 6/3887* (2013.01)

(58) Field of Classification Search
None
See application file for complete search history.

(56) References Cited

U.S. PATENT DOCUMENTS

| | | | | |
|---|---|---|---|---|
| 5,600,747 A * | 2/1997 | Yamakawa | | G02B 6/3879 385/59 |
| 7,036,993 B2 * | 5/2006 | Luther | | G02B 6/3846 385/53 |
| 7,296,935 B1 * | 11/2007 | Childers | | G02B 6/3885 385/55 |
| 7,717,625 B2 * | 5/2010 | Margolin | | G02B 6/3825 385/100 |
| 8,052,334 B2 * | 11/2011 | Childers | | G02B 6/3885 385/78 |
| 8,768,125 B2 * | 7/2014 | Beatty | | G02B 6/3882 385/52 |
| 2002/0186932 A1 * | 12/2002 | Barnes | | G02B 6/3846 385/78 |

(Continued)

*Primary Examiner* — Ryan A Lepisto
*Assistant Examiner* — Erin D Chiem
(74) *Attorney, Agent, or Firm* — Michael L. Leetzow, P.A.; Shubhrangshu Sengupta (57) ABSTRACT

A fiber optic ferrule with rear holes and a guide pin clamp allows for changing guide pins in the field. The guide pin clamp has a forward clamp portion to engage the rear face of the fiber optic ferrule, a rearward clamp portion configured to engage the biasing spring, and a guide pin retaining plate. The guide pin retaining plate is movable from a first position to a second position to allow for the removal or insertion of guide pins.

11 Claims, 11 Drawing Sheets

(56) References Cited

U.S. PATENT DOCUMENTS

| | | | |
|---|---|---|---|
| 2006/0285814 A1* | 12/2006 | Brown | G02B 6/3849 385/139 |
| 2010/0129031 A1* | 5/2010 | Danley | G02B 6/3818 385/59 |
| 2012/0281951 A1* | 11/2012 | Takahashi | G02B 6/3846 385/80 |
| 2013/0216185 A1* | 8/2013 | Klavuhn | G02B 6/3882 385/60 |

* cited by examiner

FIBER OPTIC FERRULE WITH REAR HOLES TO ALIGN A GUIDE PIN CLAMP WITH FIELD CHANGEABLE GUIDE PINS

REFERENCE TO RELATED CASE

This application claims priority under 35 U.S.C. § 119 (e) to provisional application No. 62/189,925 filed on Jul. 8, 2015, and under 35 U.S.C.§ 120 to U.S. patent application Ser. No. 15/247,839, filed Aug. 25, 2016, the contents of which are hereby incorporated by reference in their entirety.

BACKGROUND OF THE INVENTION

Field of the Invention

Fiber optic connectors, particularly ones having a higher number of components, like MTP connectors, are assembled with guide pins either installed or not installed. It is difficult, if not impossible, to change this configuration once the fiber optic connector is in the field. Thus, if the installer has two fiber optic connectors of one configuration (male or female) that need to be mated together, the installer has a problem because male-to-male and female-to-female matings are not possible. Guide pins, if used, are attached to a guide pin clamp (or may also be called a guide pin keeper). The guide pin clamp serves a number of functions, including holding the guide pins in a male configuration and centering a spring that biases the fiber optic ferrule towards the front end of the fiber optic connector. Since the guide pins are connected to the guide pin clamp and extend through the fiber optic ferrule, they are not easily removed once the fiber optic connector is completed. In a traditional female configuration, the guide pin clamp may have short extensions that are inserted into the guide pin holes in the fiber optic ferrule to align the pin clamp and the spring with the fiber optic ferrule. However, using such a guide pin clamp prevents any attempt to change the fiber optic connector between a female configuration and a male configuration due to the short extensions.

When the fiber optic connector is made with the intention of being able to field-covert the fiber optic connector from one configuration to another, the ability to align the pin clamp with the fiber optic ferrule is severely compromised, if not totally destroyed. Thus, a fiber optic connector that allows for the guide pins to be inserted or removed in the field (or anywhere, really) without removing any other components of the fiber optic connector and maintaining alignment with the fiber optic ferrule is needed.

SUMMARY OF THE INVENTION

The present invention is directed to a pin clamp for use with a fiber optic connector, the fiber optic connector having at least one housing, a fiber optic ferrule disposed at least partially within the at least one housing of the fiber optic connector, the fiber optic ferrule having guide pin openings extending from a front face to a rear face of the fiber optic ferrule to receive a guide pin therein, a spring, and a spring push, the pin clamp including a forward clamp portion to engage the rear face of the fiber optic ferrule, the forward clamp portion having at least two projections configured to engage corresponding openings in the rear face of the fiber optic ferrule, a rearward clamp portion configured to engage the spring for biasing the fiber optic ferrule in the fiber optic connector, and a guide pin retaining plate disposed between the forward clamp portion and the rearward clamp portion, the guide pin retaining plate configured to engage a portion of each of the guide pins.

In some embodiments, the forward clamp portion has a front face and a rear face, the at least two projections extending from the front face and away from the forward clamp portion and the forward clamp portion also having two guide pin openings extending therethrough to receive a guide pin in each of the two guide pin openings, and at least two rearward projections extending from the rear face and away from the forward clamp portion to engage the rearward clamp portion.

In some other embodiments, the rearward clamp portion has a front face and a rear face, the rear face configured to engage the spring for biasing the fiber optic ferrule, the front face having at least two openings to receive at least a portion of a respective one of the at least two rearward projections extending from the rear face of the forward clamp portion, and two guide pin openings to receive at least a portion of one of the guide pins.

In another embodiment, the guide pin retaining plate is disposed between the forward clamp portion and the rearward clamp portion, the guide pin retaining plate having two guide pin openings therein to allow one of the guide pins to pass therethrough and into the guide pin openings in the rearward clamp portion.

According to another aspect of the present invention, there is a fiber optic connector having field-changeable guide pins that includes at least one housing defining a passageway, a fiber optic ferrule disposed at least partially within the passageway of the at least one housing of the fiber optic connector, the fiber optic ferrule having guide pin openings extending through the fiber optic ferrule from a front face to a rear face thereof to receive a field-changeable guide pin therein, a pin clamp comprising a forward clamp portion, a rearward clamp portion and a guide pin retaining plate, wherein the forward clamp portion is configured to engage the rear face of the fiber optic ferrule, the forward clamp portion having at least two projections extending therefrom to engage corresponding openings in the fiber optic ferrule, and wherein the rearward clamp portion is configured to engage a spring for biasing the fiber optic ferrule in the fiber optic connector, and wherein the guide pin retaining plate is disposed between the forward clamp portion and the rearward clamp portion, the guide pin retaining plate having two guide pin openings therethrough to allow one of the field-changeable guide pins to pass therethrough, the spring disposed within the at least one housing and rearwardly of the pin clamp, and a spring push engaging the spring and the connector housing to retain the spring and fiber optic ferrule within the connector housing.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention, and together with the description, serve to explain the principles and operations of the invention.

DETAILED DESCRIPTION OF THE PREFERRED EMBODIMENTS

Reference will now be made in detail to the present preferred embodiment(s) of the invention, examples of which are illustrated in the accompanying drawings. Whenever possible, the same reference numerals will be used throughout the drawings to refer to the same or like parts.

Figure 1:
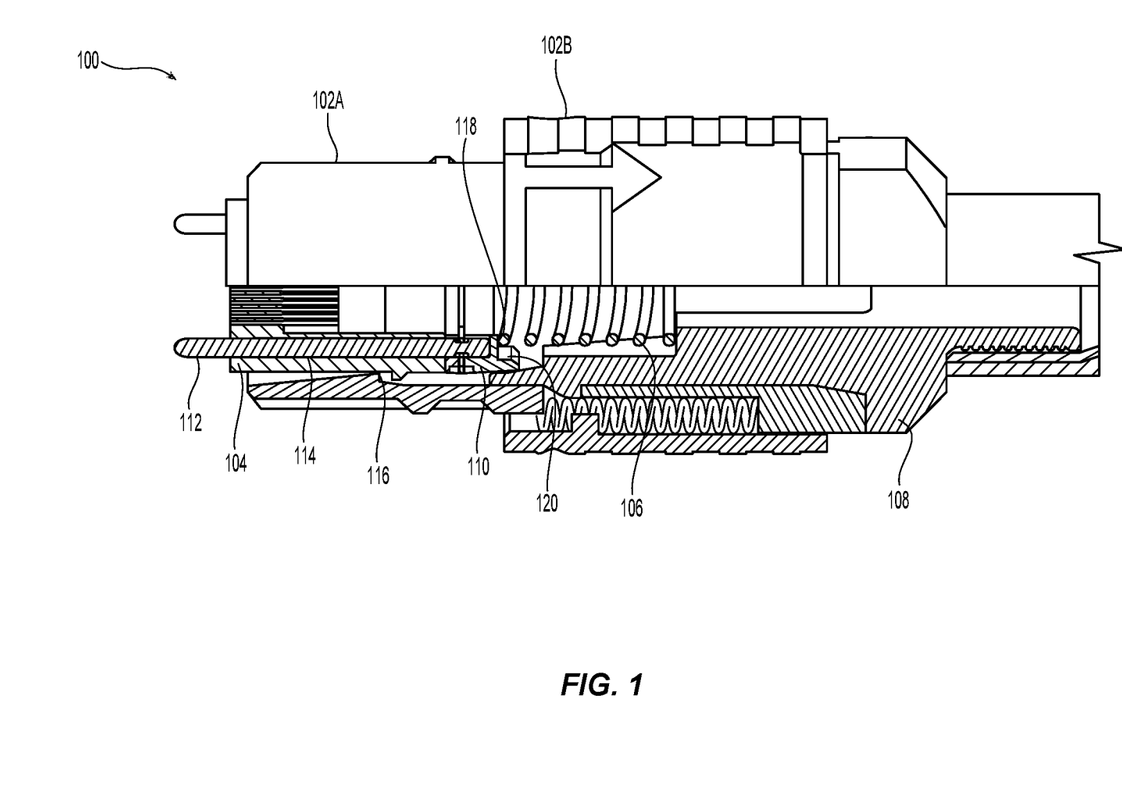
FIG. 1 is a cross sectional view of one embodiment of a fiber optic connector according to the present invention.
Figure 4:
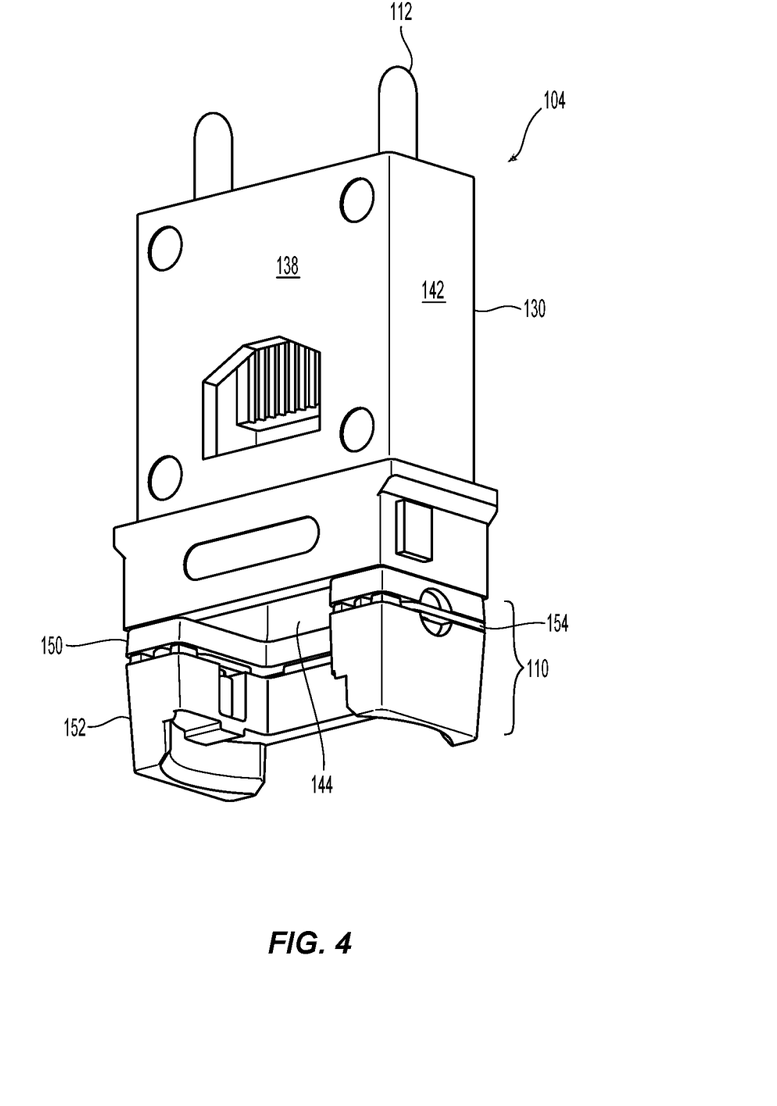
FIG. 4 is a perspective view of the fiber optic ferrule and pin clamp according in FIG. 2 showing the rear, top, and right sides thereof.

Referring to FIG. 1, a fiber optic connector 100 according to one embodiment of the present invention is illustrated. The fiber optic connector 100 includes a connector inner housing 102A and outer housing 102B, a fiber optic ferrule 104, a spring 106, a spring push 108, a guide pin clamp 110, and guide pins 112 in guide pin holes 114. As is known in the art, the fiber optic ferrule 104 is inserted into the connector housing 102 and it engages a seating surface 116, which prevents the the fiber optic ferrule 104 from traveling too far toward the front of the connector housing 102. The spring 106 is inserted behind the guide pin clamp 110, which is behind the fiber optic ferrule 104 to bias the fiber optic ferrule 104 toward the seating surface 116. A spring push 108 engages the back end of the spring 106 and the connector housing 102, securing the fiber optic ferrule 104, a spring 106, the spring push 108, and the guide pin clamp 110 in the connector housing 102. When the fiber optic connector 100 engages another fiber optic ferrule (not shown), the fiber optic ferrules 104 of the two fiber optic connectors engage one another, causing the spring 106 to be compressed between the guide pin clamp 110 (which engages the rear end of fiber optic ferrule 104) and the spring push 108. The fiber optic ferrule 104 is pushed rearwardly and the fiber optic ferrule 104 is unseated from the seating surface 116 as illustrated in FIG. 1. As long as the spring 106 squarely engages the back end 118 of the guide pin clamp 110, then the fiber optic ferrule 104 can appropriately engage the other fiber optic ferrule. The spring 106 is designed to engage the back end 118 of the guide pin clamp 110 adjacent the two spring retaining members 120. See also FIG. 4. However, the spring 106 may also engage the the back end 116 of the guide pin clamp 110 on other surfaces on the back end 118 of the guide pin clamp 110. When the spring 106 contacts only a portion of the guide pin clamp 110, an off-axis moment is created and interferes with the mating of the fiber optic ferrules. More discussion of the off-axis force issues and structures to be added to a guide pin clamp are discussed in co-pending application Ser. No. 15/137,303, filed on Apr. 25, 2016, the contents of which are incorporated herein in their entirety.

Turning to FIGS. 2-9, one embodiment of a combination of a fiber optic ferrule 104 and a guide pin clamp 110 according to the present invention is illustrated. As is known in the art, a guide pin clamp is installed behind the fiber optic ferrule to hold the guide pins in the ferrule (for the male version) when the fiber optic connector is mated and unmated with another fiber optic connector. As a result, the guide pins are not removed from the fiber optic connector. In the female version, the guide pin clamp typically keeps the spacing correct within the fiber optic connector, eliminating the need for different springs.

Figure 2:
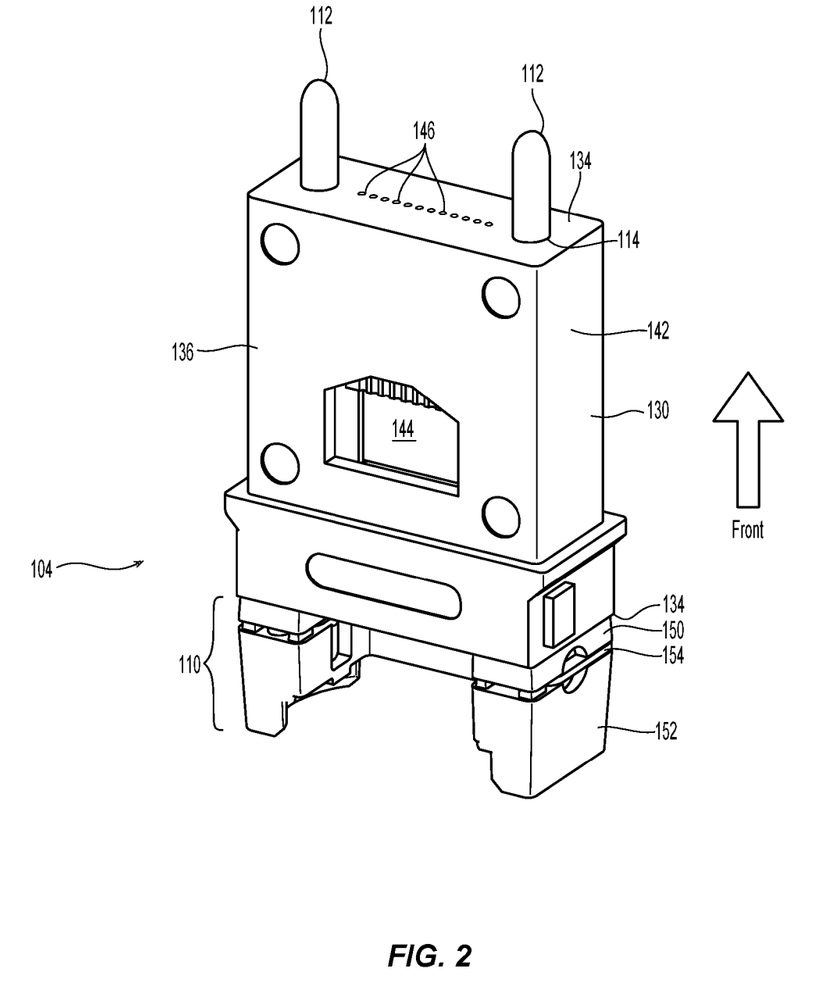
FIG. 2 is a perspective view of one embodiment of a fiber optic ferrule and pin clamp according to the present invention showing the front, top, and right sides thereof.
Figure 3:
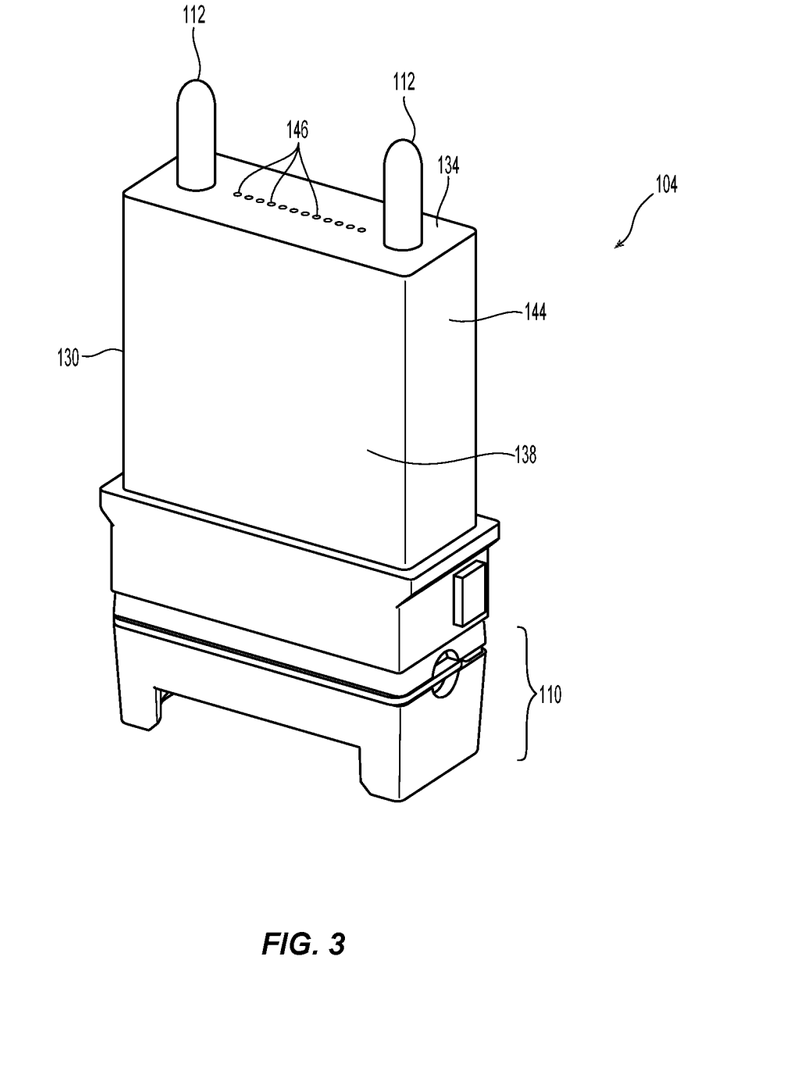
FIG. 3 is a perspective view of the fiber optic ferrule and pin clamp in FIG. 2 showing the front, bottom, and left sides thereof.

As used herein, the term "front" and "forward" means that direction where the fiber optic connector would mate with another fiber optic connector or device, while the term "rear" or "rearward" is used to mean the direction from which the optical fibers enter into the fiber optic ferrule. So turning to FIG. 2, the front is the direction shown by the arrow and "back" or "rearward" is the opposite direction. Thus, the front of the fiber optic ferrule 104 is pointed out of the page in FIG. 2 and the rear or rearward end of the fiber optic ferrule 104 (and the guide pin clamp) is pointing downward into the paper. Similarly, the top of the fiber optic ferrule is that side that has an opening into the fiber optic ferrule as illustrated in FIG. 2 while the bottom is the large surface in FIG. 3.

The fiber optic ferrule 104 has a main body 130 having a front face 132, a rear face 134 (see FIG. 8), a top 136, a bottom 138 (see FIG. 3), two sides 140,142, and a first opening 144 extending from the rear face 134 toward the front face 132. The first opening 144 is configured to receive optical fibers (not shown) which transmit the light through the fiber optic ferrule 104. The fiber optic ferrule 104 also has a plurality of optical fiber openings 146 disposed in the main body 130 between the front face 132 and the first opening 144, each of the optical fiber openings 146 to receive an optical fiber therein (not shown). The rear face 134 also has at least two openings 148 (see FIG. 8) extending from the rear face 132 into the main body 130 towards the front face 132

The guide pin clamp 110 has a forward clamp portion 150 and a rearward clamp portion 152, the forward clamp portion 150 and the rearward clamp portion 152 having a guide pin retaining plate 154 therebetween. While the three components of the guide pin clamp 110 are illustrated as being independent elements, they may also be connected or otherwise attached to one another and still come within the scope of the present invention. The forward clamp portion 150 is that portion of the guide pin clamp 110 that is closest to and engages the fiber optic ferrule 104. The forward clamp portion 150 has a front face 160 and a rear face 162. The forward clamp portion 150 has at least two projections 164 extending from the front face 160 and away from the forward clamp portion 150. The two projections 164 are configured to engage the two openings 148 in the rear face 132 of the main body 130. The engagement of the fiber optic ferrule 104 by the forward clamp portion 150 (in conjunction with the other portions of the guide pin clamp 110) aligns the spring 106 with the fiber optic ferrule 104 for consistent biasing force as explained above. While two projections 164 are illustrated on the front face 160, there may also be three, four or more projections to align the fiber optic ferrule 104 and the forward clamp portion 150. The projections 164 may also be of different sizes (e.g., smaller or larger) and may also be of a different shape (e.g., oval, square, rectangle, etc.). As illustrated, the forward clamp portion 150 is generally u-shaped (as are all of the components 150, 152, 154 of the guide pin clamp 110) to allow optical fibers to pass through the guide pin clamp 110 and into the fiber optic ferrule 104. This configuration also allows for the components to be added after the fiber optic ferrule 104 is installed on the optical fibers. The forward clamp portion 150 also has two guide pin openings 166 extending through the forward clamp portion 150 to receive the guide pins 112. However, the forward clamp portion 150 need not have separate openings 166 but the guide pins could pass through the u-shaped portion (even if it were an extended portion).

On the rear face 162 of the forward clamp portion 150 are four projections 168 that extend away from the rear face 162 and the forward clamp portion 150 in a rearward direction to engage the rearward clamp portion 152.

The rearward clamp portion 152 provides a dual function—it is a component of the guide pin clamp 110 and provides a structure for engaging the spring 106. The rearward clamp portion 152 has a front face 170 and a rear facing portion 172. The front face 170 has four openings 174 that correspond to the four projections 166 that extend away from the rear face 162 of the forward clamping portion 150. When the four projections 166 that extend away from the rear face 162 engage the four openings 174, the rearward clamp portion is connected to the fiber optic ferrule 104 through the forward clamp portion 150 and projections 164.

The rearward clamp portion 152 also includes two openings 176 to receive the ends of the guide pins 112 therein. The openings 176 are illustrated best in FIG. 9 as being more of a slot than as a circular hole like those illustrated as openings 174. It should be noted that the guide pins 112 do not need to engage the rearward clamp portion 152, as the guide pins 112 are secured to the pin clamp 110 by the guide pin retaining plate 154 as discussed in more detail below.

The rearward clamp portion 152 also has a plurality of projections 178, projections 178a and projections 178b, extending from the front face 170 and away from the rearward clamp portion 152. Thus, the plurality of projections 178 extend toward the forward clamp portion 150. There are two projections 178a are on either side of the two openings 174 at the top of the rearward clamp portion 152 and there is one elongated projection 178b at the bottom of the rearward clamp portion 152 between the two lower openings 174. The projections 178 create a space between the forward clamp portion 150 and the rearward clamp portion 152 for the guide pin retaining plate 154. As discussed below in detail, the guide pin retaining plate 154 needs to be able to move between the forward clamp portion 150 and the rearward clamp portion 152. The projections 178 create a space for the guide pin retaining plate 154, without which the forward clamp portion 150 and the rearward clamp portion 152 may pinch the guide pin retaining plate 154, preventing the required movement.

The rear facing portion 172 of the rearward clamp portion 152 is configured to engage the spring 106 for biasing the fiber optic ferrule 104 towards the front of the fiber optic connector 100. The rearward clamp portion 152 has the two spring retaining members 120 that have an inside surface 122 that is preferably shaped to retain the spring 106. On a rearward facing surface 180 that is interior to the two spring retaining members 120 and the inside surfaces 122 are a pair of spring pads 182, one disposed on each side near the inside surface 122 of the two spring retaining members 120. Each of the pair of spring pads 182 has an engagement surface 184 facing away from the fiber optic ferrule 104 or in a rearward direction as noted above. The engagement surfaces 184 of the pair of spring pads 182 lie in a single plane to avoid the issues of the off-axis pressure noted above.

Figure 5:
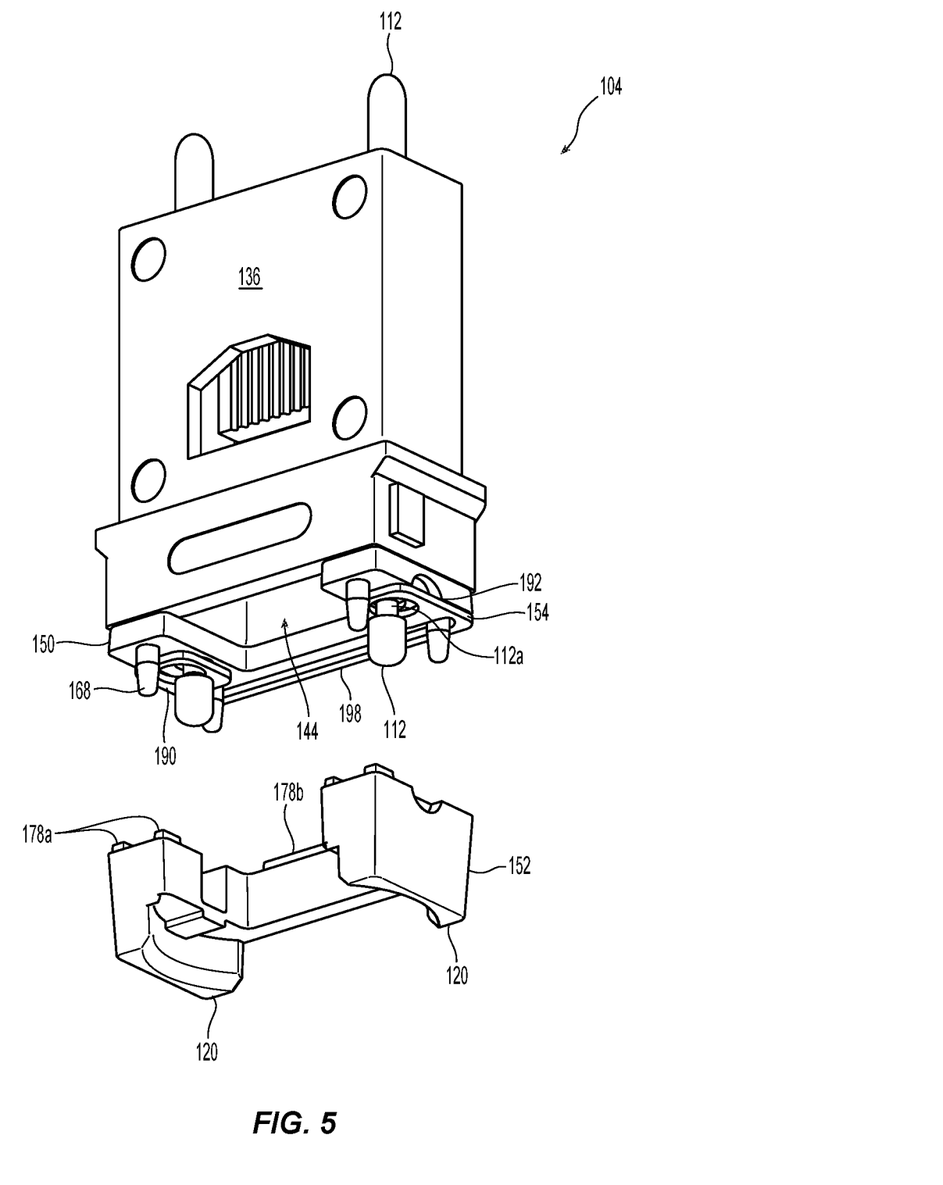
FIG. 5 is a partially exploded view of the fiber optic ferrule and pin clamp of FIG. 4 with the rearward clamp portion pulled rearwardly.
Figure 6A:
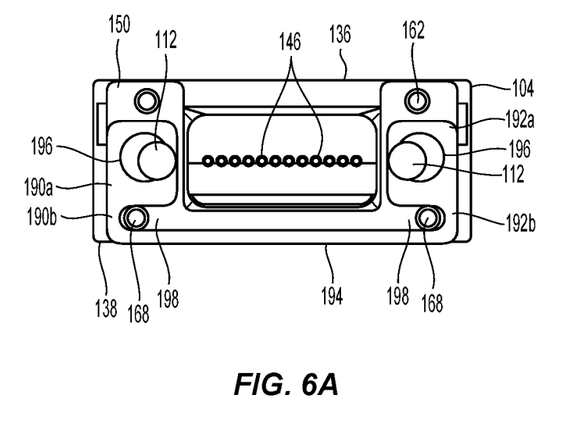
FIG. 6A is a rear view of the fiber optic ferrule and pin clamp of FIG. 5 with the rearward clamp portion removed and the guide pin retaining plate in a first position.
Figure 6B:
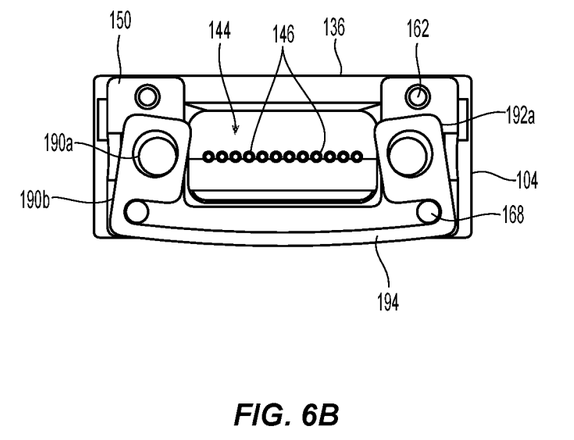
FIG. 6B is a rear view of the fiber optic ferrule and pin clamp of FIG. 5 with the rearward clamp portion removed and the guide pin retaining plate in a second position.
Figure 7:
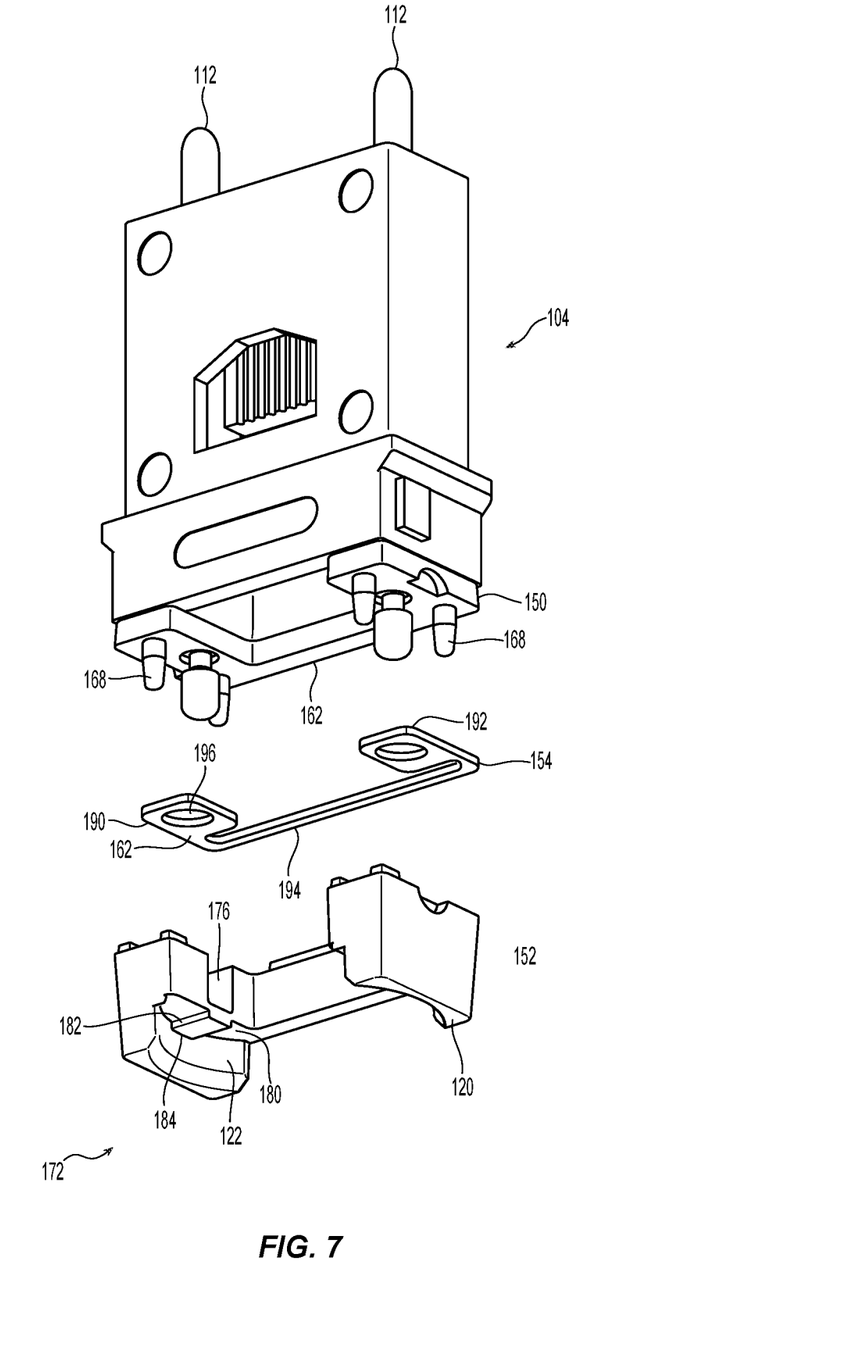
FIG. 7 is a partially exploded view of the fiber optic ferrule and pin clamp of FIG. 4 with the rearward clamp portion and guide pin retaining plate pulled rearwardly.
Figure 8:
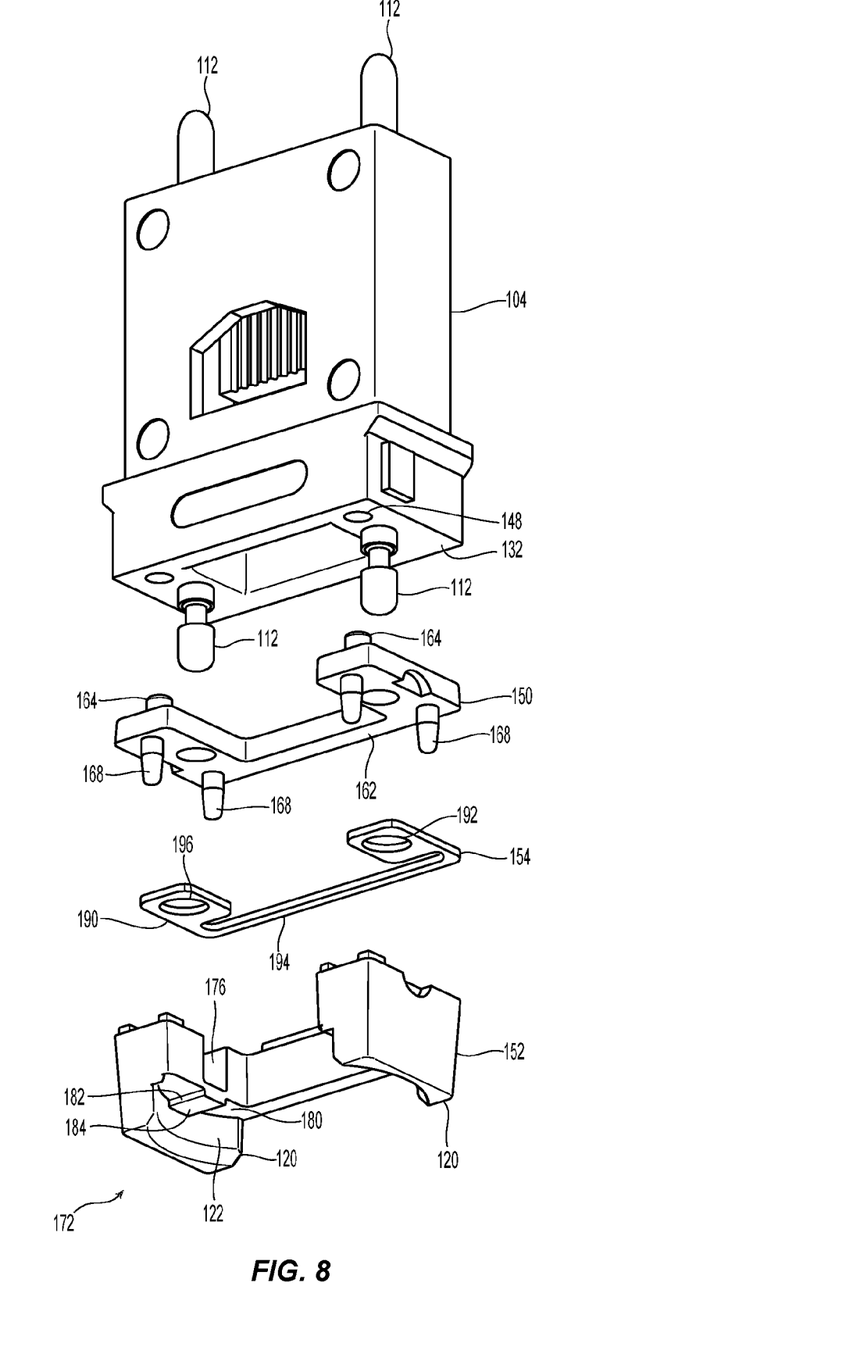
FIG. 8 is a partially exploded view of the fiber optic ferrule and pin clamp of FIG. 4 with the rearward clamp portion, the forward clamp portion, and guide pin retaining plate pulled rearwardly.
Figure 9:
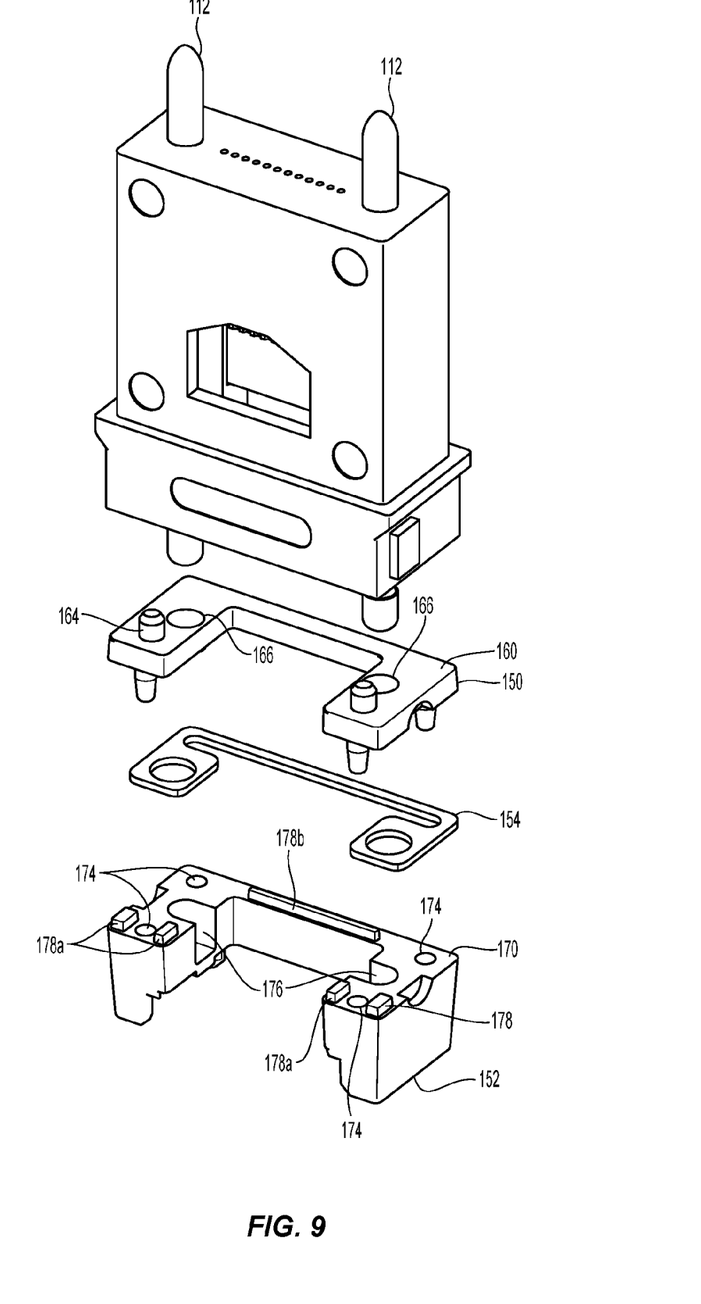
FIG. 9 is a view of partially exploded view of the fiber optic ferrule and pin clamp of FIG. 8 from the opposite direction.

The guide pin retaining plate 152 is, as best illustrated in FIGS. 5, 7, and 8, disposed between the forward clamp portion 150 and the rearward clamp portion 152. The guide pin retaining plate 152 is generally u-shaped and has two upward extending portions 190, 192 on either side of a lower bar 194. Each of the upward extending portions 190, 192 have a first portion 190a, 192a and a second portion 190b, 192b, the first portion 190a, 192a having guide pin openings 196. The second portion 90b,192b connects the first portion 190a, 192a to the lower bar 194. The second portion 190b, 192b having a smaller width than the first portion 190a, 192a, creating a opening 198 between the first portion 190a, 192a and the lower bar 194. The reason for this configuration is explained with reference to FIGS. 5, 6A, and 6B.

FIGS. 5 and 6A show the guide pin retaining plate 152 in a first position, one in which the guide pin retaining plate 152 is usually found. The guide pin retaining plate 152 is positioned against the forward clamp portion 150, with the guide pins 112 passing through the guide pin openings 196. Two of the four projections 168 are dispose within the opening 198 between the first portion 190a,192a and the lower bar 194. As best illustrated in FIG. 6A which illustrates the normal position of the guide pin retaining plate 152, the guide pin openings 196 are slightly offset relative to the guide pins 112. Thus, a part of the first portions 190a, 192a engage a slot 112a on the guide pins 112, preventing the guide pins 112 from being removed from the fiber-optic ferrule 104 through the front face 134. This position of the guide pin retaining plate 152 also prevents a guide pin 112 from being inserted into a fiber optic ferrule 104 that is in a female configuration.

To remove or insert guide pins 112 into the fiber optic ferrule 104, pressure is applied to the first portions 190a, 192a as illustrated in FIG. 6B to move the first portions 190a, 192a to a second position. While FIG. 6B illustrates both sides of the guide pin retaining plate 152 being pushed in simultaneously, typically only one side is engaged at a time. When the s first portion 190a, 192a is pushed, it rotates about the projection 168 (flexing around the second portion 190b, 192b) and causes the lower bar 194 to flex downward. This second position allows the guide pin opening 196 to align with the guide pin 112 (as well as the guide pen hole 114 in the fiber optic ferrule 104). Then, the guide pin 112 has a clear path and can either be removed from or inserted into the guide pin hole 114 from the front face 134 of the fiber optic ferrule 104. Releasing the pressure on the first portions 190a, 192a then allows guide pin retaining plate 152 to return to its normal position as illustrated in FIGS. 5 and 6A.

Figure 10:
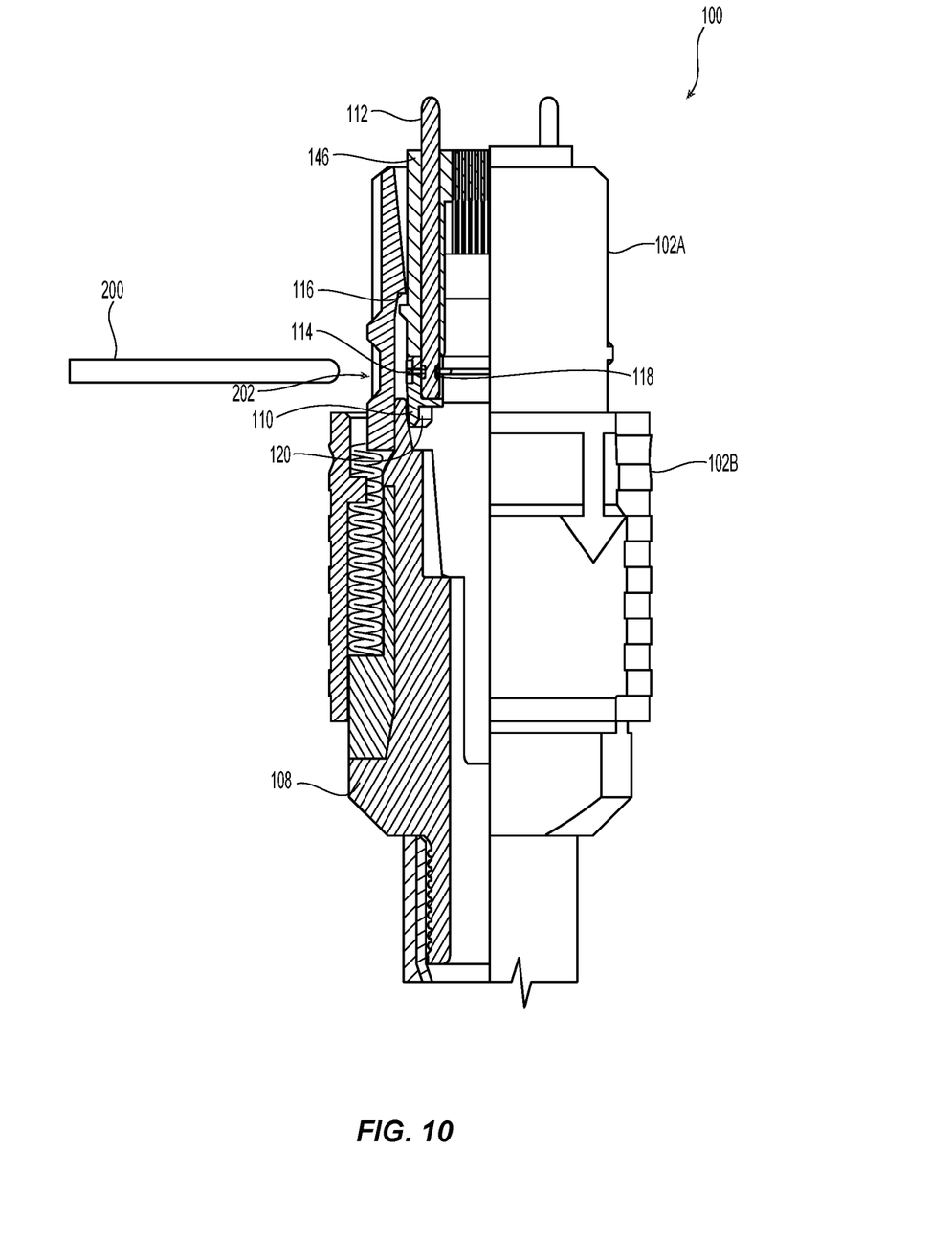
FIG. 10 is a partial cross sectional view of the fiber optic connector according to the present invention with a tool to remove/insert guide pins prior to insertion into the fiber optic connector.
Figure 11:
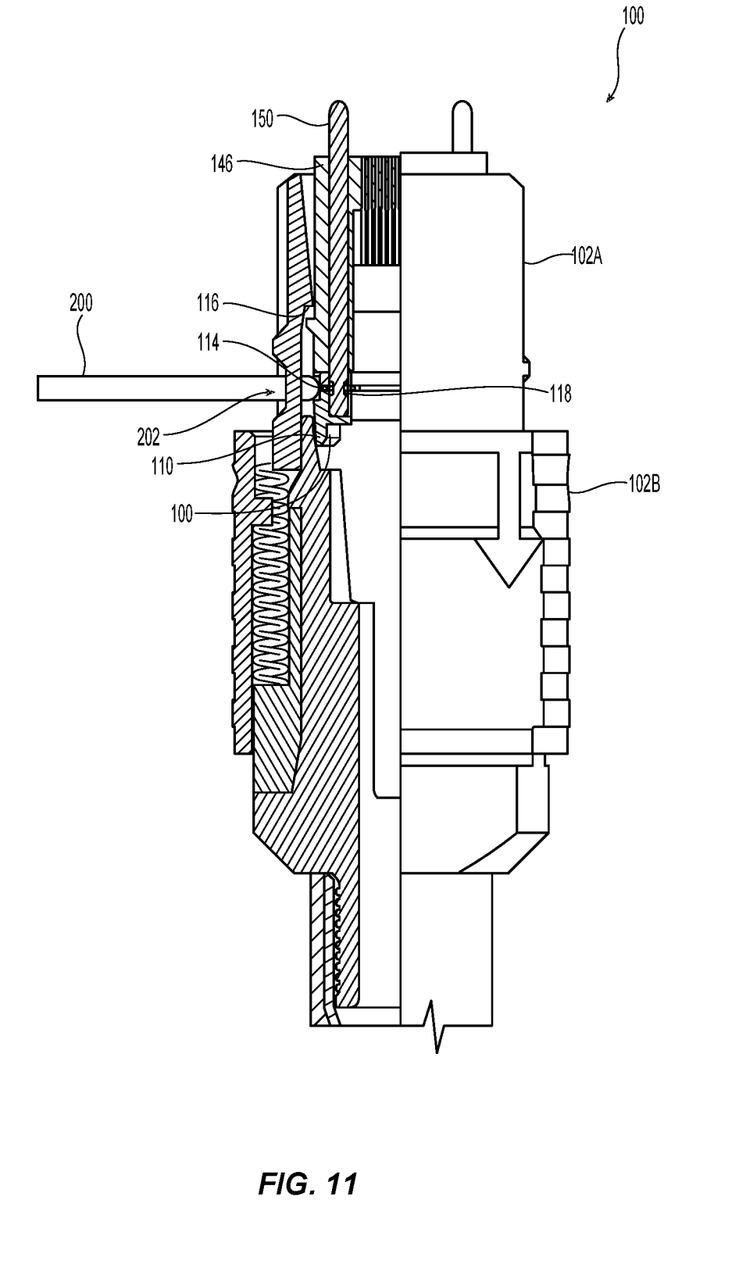
FIG. 11 is a partial cross sectional view of fiber optic connector, tool and pin clamp of FIG. 10 with the tool making contact with the guide pin retaining plate to allow for insertion or removal of the guide pins.

Turning to FIGS. 10 and 11, where a tool 200 is illustrated in FIG. 10 as being prior to insertion and then in FIG. 11 after insertion into a fiber optic connector 100 to engage the first portions 190a, 192a. The tool 200 applies the necessary pressure to the first portions 190a, 192a as illustrated in FIG. 6B to allow for the removal or insertion of the guide pins 112. In FIGS. 10 and 11, an MTP fiber optic connector 100 is illustrated. As recognized by one of ordinary skill in the art, the MTP fiber optic connector 140 has an inner housing 102A, an outer housing 102B, and the fiber optic ferrule 104. To gain access to the latches first portions 190a, 192a disposed in the fiber optic connector 100, the outer housing 102B and the fiber optic ferrule 104 are pushed rearward relative to the inner housing 102A. The movement of the outer housing 102B exposes an opening 202 in the inner housing 102A and the movement of the fiber optic ferrule 104 positions the first portions 190a, 192a adjacent the opening 202 in the inner housing 120A. At this point, the installer can insert a small tool 200 (a guide pin would also work) to press the first portions 190a, 192a inward, causing the movement from the first position to the second position as illustrated in FIGS. 6A and 6B.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber optic ferrule for use with a fiber optic connector, the fiber optic connector having a pin clamp having at least two projections extending therefrom, the fiber optic ferrule comprising:
    a main body having a front face, a rear face, a first opening extending from the rear face toward the front face to receive optical fibers therein;
    at least one guide pin opening extending between the front face and rear face; and
    at least two openings extending from the rear face into the main body towards the front face, the at least two openings configured to receive a respective one of the at least two projections extending from the pin clamp.

2. The fiber optic ferrule according to claim 1, wherein the guide pin openings are to receive a field-changeable guide pin therein.

3. The fiber optic ferrule according to claim 1, wherein one of the at least two openings is disposed above each of the guide pin openings.

4. The fiber optic ferrule according to claim 1, wherein one of the at least two openings is disposed between each of the guide pin openings and a top surface of the fiber optic ferrule.

5. The fiber optic ferrule according to claim 1, wherein one of the at least two openings disposed above each of the guide pin openings.

6. A fiber optic connector having field-changeable guide pins comprising:
    at least one housing defining a passageway;
    a fiber optic ferrule disposed at least partially within the passageway of the at least one housing, the fiber optic ferrule having guide pin openings extending through the fiber optic ferrule from a front face to a rear face thereof to receive a field-changeable guide pin therein; and
    a pin clamp comprising a forward clamp portion, a rearward clamp portion and a guide pin retaining plate, the forward clamp portion being configured to engage the rear face of the fiber optic ferrule, the forward clamp portion having at least two projections extending therefrom to engage corresponding openings in the fiber optic ferrule,
    wherein the rearward clamp portion is configured to engage a spring for biasing the fiber optic ferrule in the fiber optic connector, and wherein the guide pin retaining plate having two guide pin openings therethrough to allow a respective field-changeable guide pin to pass therethrough; the spring disposed within the at least one housing and rearwardly of the pin clamp.

7. A pin clamp for use with a fiber optic connector, the fiber optic connector having at least one housing, a fiber optic ferrule disposed at least partially within the at least one housing, the fiber optic ferrule having guide pin openings extending from a front face to a rear face of the fiber optic ferrule to receive a guide pin therein, and a spring, the pin clamp comprising:
    a forward portion having at least two projections configured to engage corresponding openings in the rear face of the fiber optic ferrule; and
    a guide pin retaining plate positioned adjacent the forward portion, the guide pin retaining plate configured to engage a portion of each of the guide pins.

8. The pin clamp according to claim 7, wherein the forward portion also has two rearward projections extending from a surface opposite the at least two projections and extending away from the at least two projections.

9. The pin clamp according to claim 8, wherein the guide pin retaining plate is disposed between the forward clamp portion and the rearward clamp portion, the guide pin retaining plate having two guide pin openings therein to allow one of the guide pins to pass therethrough.

10. The pin clamp according to claim 8, wherein the at least two rearward projections extending away from the forward clamp portion pass through at least one opening in the guide pin retaining plate.

11. The pin clamp according to claim 7, further comprising a rearward clamp portion disposed adjacent the guide pin retaining plate.

* * * * *